United States Patent
Yasuda (10) Patent No.: US 8,025,333 B2
(45) Date of Patent: Sep. 27, 2011

(54) VEHICLE SEATS AND DETACHABLE COVER THEREFOR

(75) Inventor: Ryo Yasuda, Kariya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 88 days.

(21) Appl. No.: 12/342,697

(22) Filed: Dec. 23, 2008

(65) Prior Publication Data

US 2009/0160230 A1 Jun. 25, 2009

(30) Foreign Application Priority Data

Dec. 25, 2007 (JP) ................................. 2007-331841

(51) Int. Cl.
*A47C 31/00* (2006.01)
*A44B 19/00* (2006.01)
(52) U.S. Cl. ..................................... 297/228.13; 24/382
(58) Field of Classification Search ............. 297/228.13, 297/218.1, 218.2, 219.11, 219.1, 219.12, 297/228.12, 223, 220, DIG. 6; 24/381, 382, 24/386, 427, 415, 416, 417; 190/903
See application file for complete search history.

(56) References Cited

U.S. PATENT DOCUMENTS

| D97,035 S | * | 9/1935 | Blatz ............................ D11/221 |
| 4,019,776 A | | 4/1977 | Takamatsu |
| 4,036,524 A | * | 7/1977 | Takamatsu ................. 297/219.1 |
| 4,303,001 A | * | 12/1981 | Trungold ........................ 411/10 |
| 4,668,011 A | * | 5/1987 | Fister, Jr. .................... 297/218.5 |
| 5,007,676 A | * | 4/1991 | Lien .......................... 297/228.13 |
| 6,079,779 A | * | 6/2000 | Tanaka et al. ............. 297/228.13 |
| 2008/0061610 A1 | * | 3/2008 | Tache ......................... 297/219.1 |

FOREIGN PATENT DOCUMENTS

| DE | 8337429 | 4/1984 |
| FR | 2914594 | 10/2008 |
| GB | 1503460 | 3/1978 |
| JP | 1-119551 | 8/1989 |
| WO | WO 9412366 A1 * | 6/1994 |

* cited by examiner

*Primary Examiner* — Milton Nelson, Jr.
(74) *Attorney, Agent, or Firm* — Greenblum & Bernstein, P.L.C.

(57) ABSTRACT

A seat may includes a seat base, a seat cover that is capable of being detachably attached to the seat base, a first engagement member that is attached to a circumferential surface of the seat base, a second engagement member that is attached to the seat cover, and a third engagement member that is attached to the circumferential surface of the seat base. The first engagement member is capable of engaging the second engagement member when the seat cover is attached to the seat base, so as to fix the seat cover to the seat. The first engagement member is capable of engaging the third engagement member when the first engagement member does not engage the second engagement member.

20 Claims, 5 Drawing Sheets

Rearward ←→ Forward

FIG. 6

Rightward ←→ Leftward

VEHICLE SEATS AND DETACHABLE COVER THEREFOR

This application claims priority to Japanese patent application serial number 2007-331841, the contents of which are incorporated herein by reference.

BACKGROUND OF THE INVENTION

1. Field of the Invention

The present invention relates to seats (vehicle seats) having seat covers for covering the seats. More particularly, the present invention relates to seats having detachable seat covers for covering the seats. Further, the present invention relates to fastening devices for fixedly attaching seat covers to seats.

2. Description of Related Art

A seat (a seat back and a seat cushion) having a detachable seat cover is already known. Such a seat is taught, for example, by Japanese Laid-Open Utility Model Publication Number 1-119551. In the seat, hook and loop fasteners are used in order to fixedly attach (fasten) the seat cover to the seat. That is, first fastener elements of the hook and loop fasteners are attached to peripheral portions of the seat cover. Conversely, second fastener elements of the hook and loop fasteners that are engageable with the first fastener elements are attached to the seat. The first and second fastener elements are positioned so as to correspond to each other. When the seat cover is applied to the seat, the first and second fastener elements engage with each other, so that the seat cover can be fixedly attached to the seat. As a result, the seat cover can be detachably attached to the seat. Thus, the seat can be covered with the seat cover.

Also, some of the first fastener elements are attached to substantial portions (central portions) of the seat cover. Similarly, some of the second fastener elements are attached to substantial portions of the seat. The first and second fastener elements are positioned so as to correspond to each other. The first and second fastener elements thus positioned engage with each other when the seat cover is applied to the seat, so that the seat cover can be reliably or accurately attached to the seat while the seat cover suitably follows a three-dimensional shape of the seat.

According to the seat thus constructed, the seat cover can be easily detached from the seat for cleaning, replacement or other such purposes. However, when the seat cover is not attached to the seat (i.e., when the seat cover is detached from the seat), the second fastener elements attached to the seat are exposed or uncovered. This may lead to an inferior appearance of the seat. Also, it can be uncomfortable to sit on the seat. Further, the uncovered second fastener elements has a possibility of scratching clothes or stockings of a passenger of the seat. As a result, the seat is not suitable for use without the seat cover.

BRIEF SUMMARY OF THE INVENTION

For example, in one aspect of the present invention, a seat may includes a seat base, a seat cover that is constructed to be detachably attached to the seat base, a first engagement member that is attached to a circumferential surface of the seat base, a second engagement member that is attached to the seat cover, and a third engagement member that is attached to the circumferential surface of the seat base. The first engagement member is capable of engaging the second engagement member when the seat cover is attached to the seat base, so as to fix the seat cover to the seat. The first engagement member is capable of engaging the third engagement member when the first engagement member does not engage the second engagement member.

According to the seat thus constructed, when the seat cover is detached from the seat base, the first engagement member is capable of engaging the third engagement member, so as to be immobilized on the seat. Therefore, when the seat cover is detached from the seat base, the first engagement member can be effectively prevented from scratching clothes of a person sitting on the seat.

In one embodiment, the third engagement member is spaced away from the first engagement member.

In another embodiment, the first, second and third engagement members respectively include first, second and third slide fastener strips. The first slide fastener strip is capable of selectively engaging the second and third slide fastener strips.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIG. 1 to FIG. 8.

First Detailed Representative Embodiment

A first detailed representative embodiment of the present invention will be described with reference to FIGS. 1 to 6.

Figure 1:
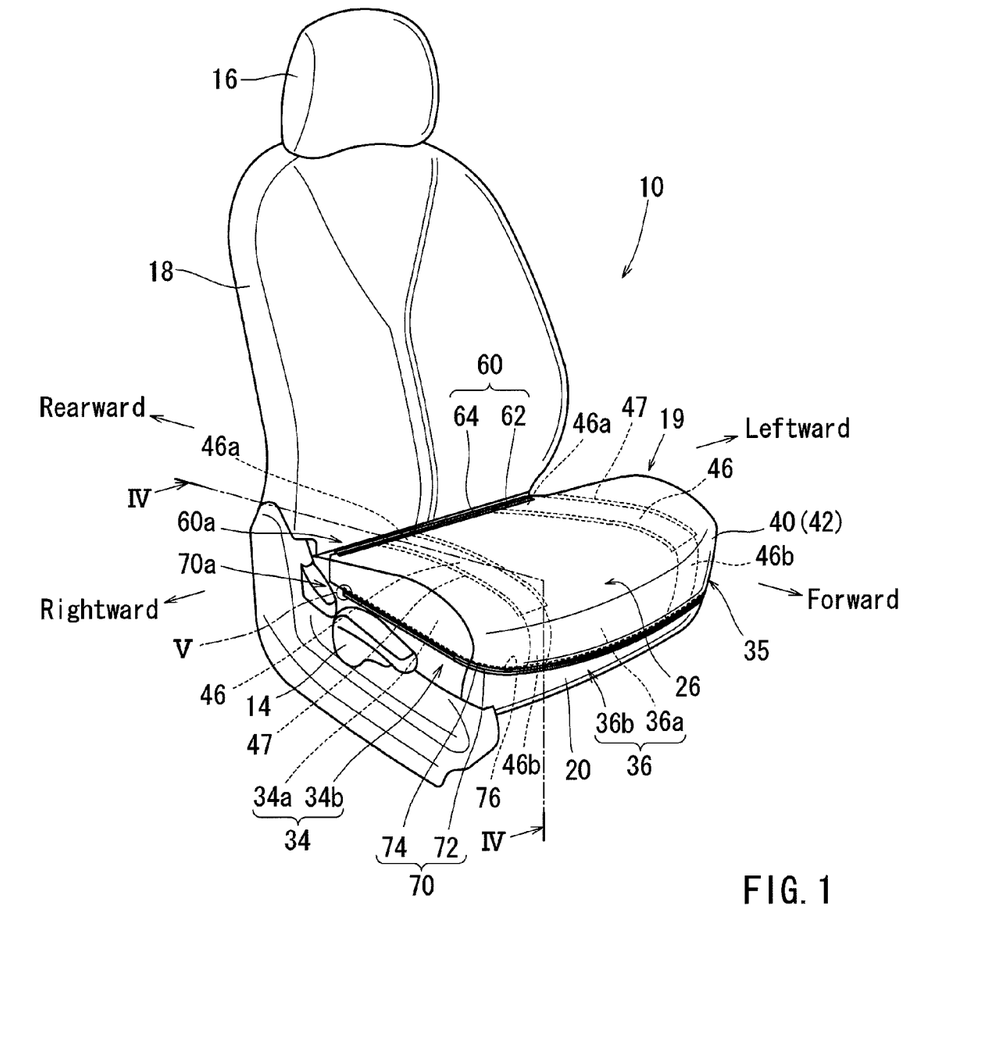
FIG. 1 is a perspective view of a seat having a seat base and a seat cover according to a first representative embodiment of the present invention.
Figure 2:
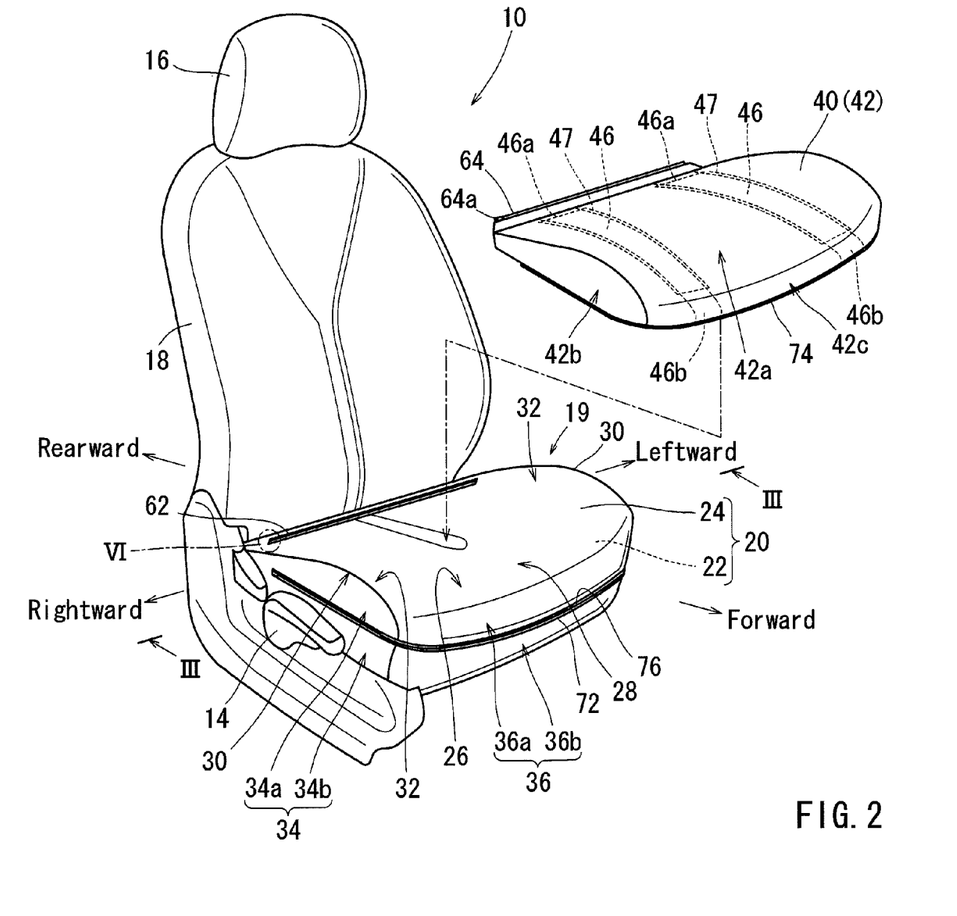
FIG. 2 is a perspective view of the seat, which illustrates a condition in which the seat cover is detached from the seat base.

As shown in FIG. 1, a representative vehicle seat 10 may preferably be arranged as a driver seat of a vehicle and includes a seat back 18 having a head rest 16 and a seat cushion 19. As shown in FIG. 2, the seat cushion 19 may preferably be constituted of a seat base 20 and a (detachable) seat cover 40 that is detachably attached to the seat base 20. As will be recognized, in the embodiment, the seat cover 40 is exemplified as a cushion cover of the seat cushion 19.

Figure 3:
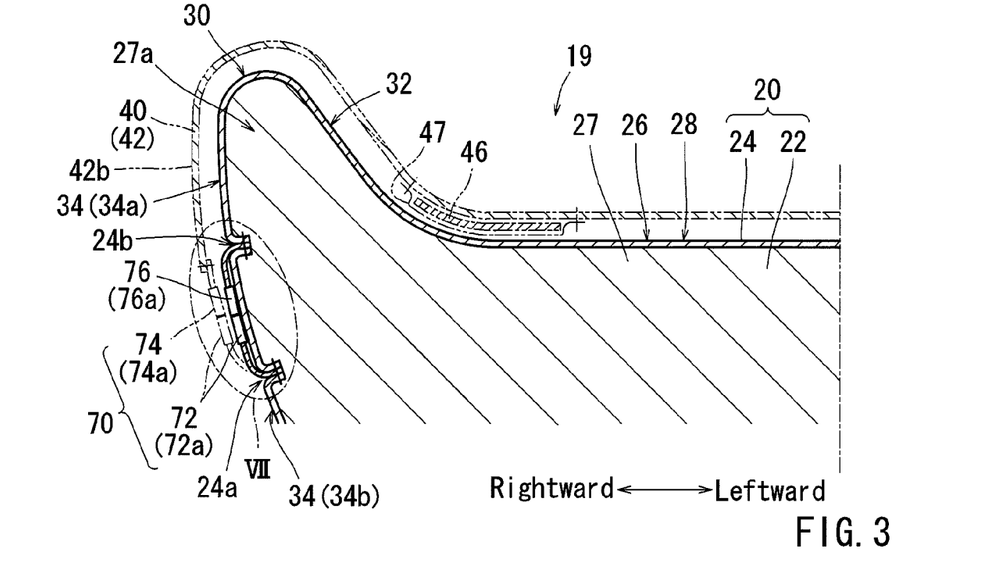
FIG. 3 is an enlarged partially cross-sectional view taken along line III-III in FIG. 2.
Figure 4:
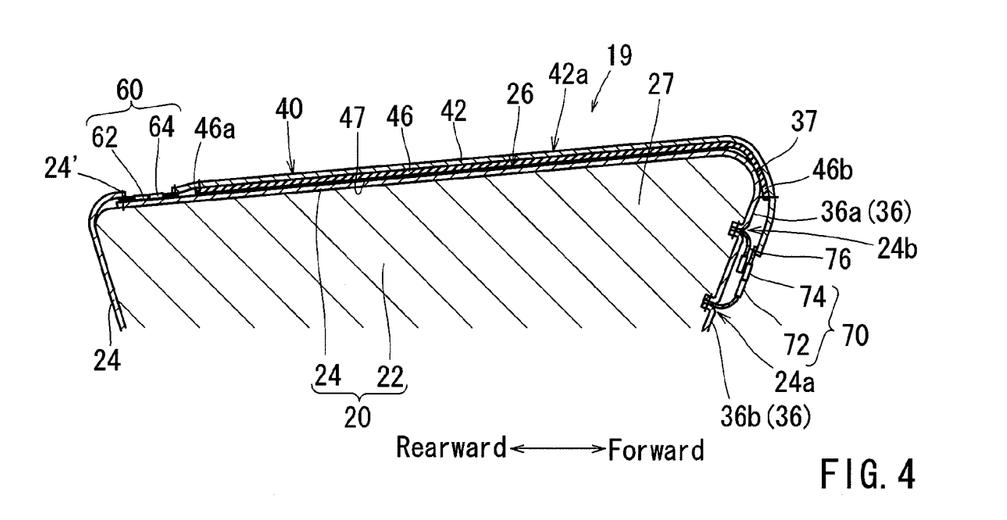
FIG. 4 is a cross-sectional view taken along line IV-IV in FIG. 1.

Before describing the seat cover 40, construction of the seat base 20 of the seat cushion 19 will be described. The seat base 20 may preferably be constituted of a cushion pad 22 and a covering member 24 attached to the cushion pad 22. The cushion pad 22 may preferably have a special three-dimensional shape. That is, as best shown in FIG. 3, the cushion pad 22 may preferably have a depressed central portion 27 and upwardly protruded side portions 27a. Conversely, as shown in FIGS. 3 and 4, the covering member 24 is arranged and constructed to closely follow the shape of the cushion pad 22 so as to have a three-dimensional shape corresponding to the three-dimensional shape of the cushion pad 22. Therefore, as shown in FIGS. 2 and 3, the seat base 20 thus constructed can have a three-dimensional shape substantially corresponding to the shape of the cushion pad 22. The seat base 20 (the covering member 24) may preferably have a (three-dimensional) outer surface. The outer surface of the seat base 20 may preferably include a depressed sitting surface 26 (a depressed surface portion) having a flattened central surface portion 28, upwardly protruded side top surfaces 30 (a protruded surface portion), inclined side transition surfaces 32 that continuously extend from the sitting surface 26 to the top surfaces 30, side surfaces 34 that extend downwardly from the top surfaces 30, and a front surface 36 (a turned surface portion) that extends downwardly from a front periphery of the sitting surface 26. Further, as shown in FIG. 4, an upper surface of the central portion 27 of the cushion pad 22 may preferably inclined rearwardly such that the sitting surface 26 of the seat base 20 can be gradually lowered rearwardly. In addition, as best shown in FIG. 2, each of the side surfaces 34 may preferably include upper and lower side surfaces 34a and 34b. Similarly, the front surface 36 may preferably be include upper and lower front surfaces 36a and 36b. Further, the side surfaces 34 and the front surface 36 will be referred to as a circumferential surface of the seat base 20.

As best shown in FIG. 2, the seat cover 40 is composed of a seat cover body 42 and a pair of elastic bands (rubber bands) 46. The seat cover body 42 may preferably be shaped to substantially correspond to the three-dimensional shape (i.e., the three-dimensional outer surface) of the seat base 20 so as to substantially cover the sitting surface 26, the side top surfaces 30, the side transition surfaces 32, the upper side surfaces 34a and the upper front surface 36 of the seat base 20. Therefore, the seat cover body 42 is shaped so as to include a curved upper portion 42a (which corresponds to the sitting surface 26, the side top surface 30 and the side transition surfaces 32), vertical side portions 42b (which correspond to the upper side surfaces 34a) and a vertical front portion 42c (which corresponds to the upper front surface 36a). Further, the seat cover body 42 may preferably be formed by sewing together a plurality of pieces of a fabric sheet. The fabric sheet may preferably be composed of a woven fabric (not shown) and a thin sponge layer (not shown) adhered to a rear surface of the woven fabric.

The elastic bands 46 may preferably be attached to a rear surface of the seat cover body 42 so as to extend in a forward and rearward direction of the seat base 20 (the seat 10). In particular, as shown in FIG. 3, a pair of fabric tapes are sewed on the rear surface of the seat cover body 42 such that a pair of elongated insertion sheaths 47 are formed therealong. As best shown in FIG. 2, the elastic bands 46 are respectively inserted into the elongated insertion sheaths 47. Further, rear end portions 46a of the elastic bands 46 inserted into the elongated insertion sheaths 47 are respectively sewed on a rear end portion of the seat cover body 42 (the seat cover body upper portion 42a). Conversely, front end portions 46b of the elastic bands 46 are respectively sewed on a front end portion of the seat cover body 42 (the seat cover body front portion 42c).

The elastic bands 46 thus attached are capable of stretching and contracting in the forward and rearward direction of the seat 10. Further, as shown in FIG. 3, the elastic bands 46 (the insertion sheaths 47) are respectively positioned so as to extend along the side transition surfaces 32 of the seat base 20 (i.e., along both sides of the sitting surface 26 of the seat base 20) when the seat cover 40 is attached to seat base 20.

Each of the elastic bands 46 may preferably have a length (an original length) shorter than a distance between a first position on the seat base 20 corresponding to the rear end portion 46a and a second position on the seat base 20 corresponding to the front end portion 46b. In other words, each of the elastic bands 46 may preferably have a length shorter than a distance between the rear end portion of the seat cover body 42 on which the rear end portions 46a of the elastic bands 46 are sewed and the front end portion of the seat cover body 42 on which the front end portions 46b of the elastic bands 46 are sewed. Therefore, when the seat cover 40 is not applied to the seat base 20, each of the elastic bands 46 is contracted to the original length. As a result, the seat cover body 42 can be partially gathered up along the contracted elastic bands 46. (In FIG. 2, a condition in which the seat cover body 42 is not gathered up is shown for clarity.) Conversely, when the seat cover 40 is applied to the seat base 20, each of the elastic bands 46 can be stretched to an elongated length. As a result, the seat cover body 42 can be expanded to follow the shape of the seat base 20 with the elastic bands 46.

Figure 5:
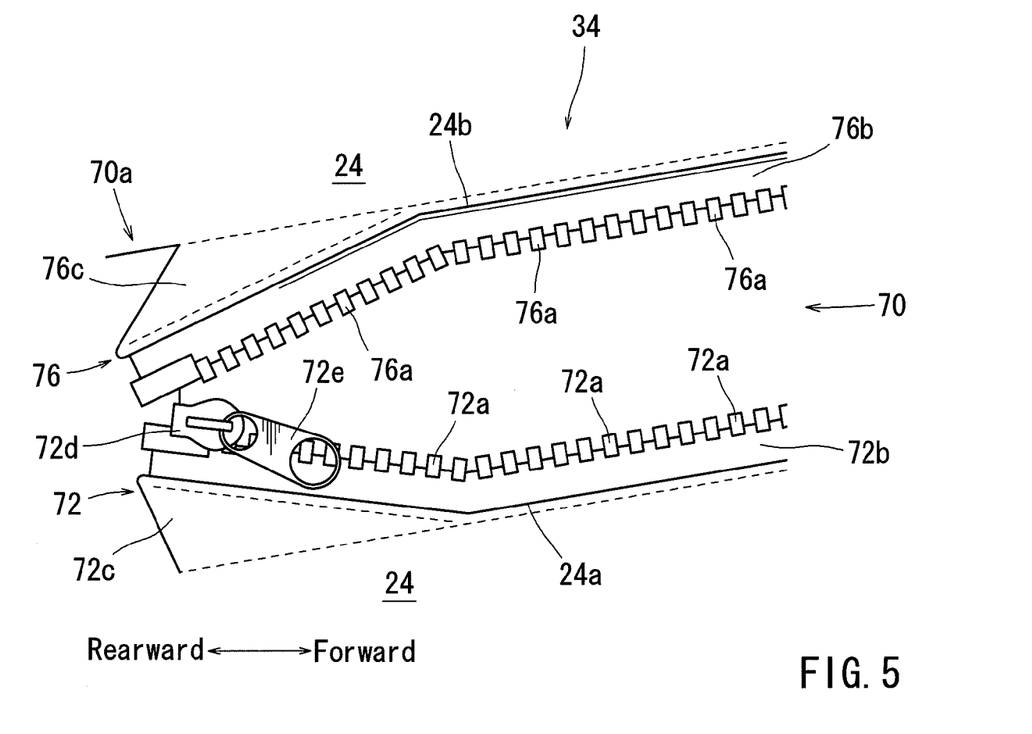
FIG. 5 is an enlarged view of an encircled portion V of FIG. 1.

As shown in FIG. 1, the seat cover 40 can be fixed to the seat base 20 via a first slide (zip) fastener 60 (a first or rear fastening device) and a second slide (zip) fastener 70 (a second or circumferential fastening device). The first fastener 60 is composed of a pair of opposed (slide) fastener strips 62 and 64 and a slider 64a (FIG. 2) having a finger grip (not shown). The second fastener 70 is composed of a pair of opposed (slide) fastener strips 72 and 74 and a slider 72d having a finger grip 72e (FIG. 5). Each of the fastener strips 62, 64, 72 and 74 is composed of a cloth tape having a series of metal or plastic teeth. The sliders 64a and 72d are respectively slidably attached to the fastener strips 64 and 72. As will be recognized, upon sliding the slider 64a after the fastener strip 64 is mated with (adjoined to) the fastener strip 62 by the slider 64a, the teeth of the fastener strips 62 and 64 mesh with each other, so that the fastener strips 62 and 64 can be engaged or joined with each other. Thus, the slide fastener 60 can be fastened. Similarly, upon sliding the slider 72d after the fastener strip 72 is mated with (adjoined to) the fastener strip 74 by the slider 72d, the teeth of the fastener strips 72 and 74 mesh with each other, so that the fastener strips 72 and 74 can be engaged or joined with each other. Thus, the slide fastener 70 can be fastened. Further, in this embodiment, each of the fastener strip 64 having the slider 64a and the fastener strip 72 having the slider 72d may be referred to as a female fastener strip. Conversely, each of the fastener strips 62 and 74 may be referred to as a male fastener strip.

As shown in FIGS. 2 and 4, the male fastener strip 62 of the first slide fastener 60 may preferably be positioned on the sitting surface 26 of the seat base 20 so as to transversely extend along a rear end periphery of the sitting surface 26 (i.e., along a rear end portion (of the outer surface) of the seat base 20). The male fastener strip 62 thus positioned is stitched on the covering member 24 of the seat base 20 (the seat 10), so as to be attached to the seat base 20. In particular, as best shown in FIG. 4, the male fastener strip 62 may preferably be stitched on an elongated cut edge 24' of the seat covering member 24. As will be appreciated, the cut edge 24' may preferably be formed by cutting the seat covering member 24 along the rear end portion of the seat base 20.

Further, as shown in FIGS. 2 and 3, the female fastener strip 72 (a first slide fastener strip or a first engagement member) of the second slide fastener 70 is positioned on the side surfaces 34 and the front surface 36 of the seat base 20 so as to extend therealong (i.e., along a side-to-front portion (of the outer surface) of the seat base 20). As best shown in FIG. 2, the female fastener strip 72 may preferably be positioned on the side and front surfaces 34 and 36 so as to laterally extend along a central portion thereof (i.e., so as to laterally extend between the upper and lower side surfaces 34a and 34b of the side surfaces 34 and between the upper and lower front surfaces 36a and 36b of the front surface 36). The female fastener strip 72 thus positioned is stitched on the covering member 24 of the seat base 20 (the seat 10), so as to be attached to the seat base 20. In particular, as shown in FIGS. 3 and 4, the female fastener strip 72 may preferably be stitched on an elongated lower cut edge 24a formed in the seat covering member 24. As will be appreciated, the lower cut edge 24a may preferably be formed by cutting the seat covering member 24 along the central portion of the side and front surfaces 34 and 36. As will be appreciated, the female fastener strip 72 may preferably be positioned so as to not interfere with a lever 14 that is capable of controlling a tilting angle of the seat back 18.

As shown in FIGS. 2 and 4, the female fastener strip 64 of the first slide fastener 60 is stitched on the seat cover body 42 (the upper portion 42a). As described above, the female fastener strip 64 has the slider 64a. As best shown in FIG. 2, the female fastener strip 64 may preferably be positioned on a rear end periphery of the seat cover body 42 so as to transversely extend therealong. The female fastener strip 64 may preferably be positioned so as to correspond to the male fastener strip 62 attached to the seat base 20 when the seat cover 40 is applied to the seat base 20. As previously described, upon sliding the slider 64a after the male fastener strip 62 is mated with the female fastener strip 64 by the slider 64a, the male fastener strip 62 engages the female fastener strip 64, so that the first slide fastener 60 can be fastened. Further, the slider 64a may preferably be arranged and constructed to mate the male and female fastener strips 62 and 64 at a (right) end portion 60a of the first slide fastener 60 (FIG. 1) that is closer to a door opening (not shown) of the vehicle. The end portion 60a of the first slide fastener 60 may be referred to as an engagement start position or a mating position of the fastener strips 62 and 64 (the first slide fastener 60).

As shown in FIGS. 2 and 3, the male fastener strip 74 (a second slide fastener strip or a second engagement member) of the second slide fastener 70 is stitched on the seat cover body 42 (the side and front portions 42b and 42c). As best shown in FIG. 2, the male fastener strip 74 may preferably be positioned so as to extend from the periphery of the seat cover body front portion 42c to peripheries of the seat cover body side portions 42b (i.e., so as to extend along front and side peripheries of the seat cover body 42). Further, the male fastener strip 74 may preferably be positioned so as to correspond to the female fastener strip 72 attached to the seat base 20 when the seat cover 40 is applied to the seat base 20. As described previously, upon sliding the slider 72d of the female fastener strip 72 after the male fastener strip 74 is mated with the female fastener strip 72 by the slider 72d, the male fastener strip 74 engages the female fastener strip 72, so that the second slide fastener 70 can be fastened. Further, the slider 72d may preferably be arranged and constructed to mate the female and male fastener strips 72 and 74 at a (right) end portion 70a of the second slide fastener 70 (FIG. 1) that is closer to the door opening of the vehicle. The end portion 70a of the second slide fastener 70 may be referred to as an engagement start position or a mating position of the fastener strips 72 and 74 (the second slide fastener 70).

Figure 6:
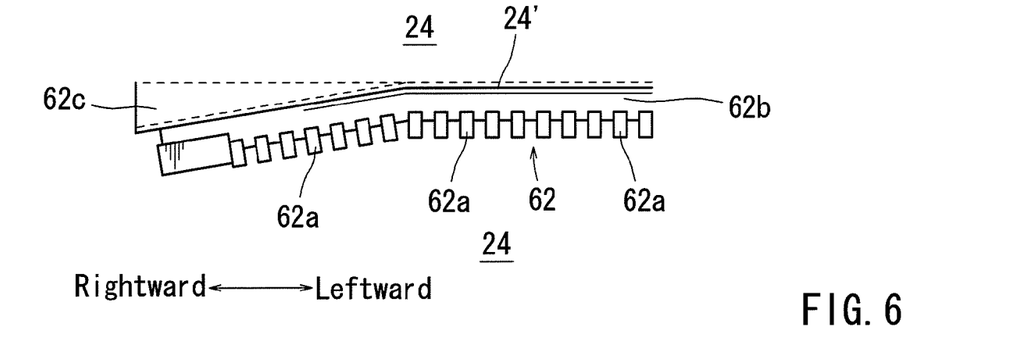
FIG. 6 is an enlarged view of an encircled portion VI of FIG. 2.

As shown in FIG. 6, the male fastener strip 62 is composed of a cloth tape 62b and a series of metal or plastic teeth (elements) 62a that are attached to a longitudinal periphery of the cloth tape 62b. An opposite longitudinal periphery of the cloth tape 62b is stitched on the covering member 24 (the cut edge 24') of the seat base 20. Thus, the male fastener strip 62 may preferably be attached to the seat base 20. However, at an end portion of the cloth tape 62b corresponding to the mating position of the first slide fastener 60, the cloth tape 62b is stitched on the covering member 24 via a triangular additional tape 62c. That is, the attached male fastener strip 62 is widened at the end portion thereof. As a result, the end portion of the male fastener strip 62 can be easily pinched or held by fingers. This may lead to easy mating of the male and female fastener strips 62 and 64 at the mating position of the first slide fastener 60.

Further, as shown in FIGS. 2, 3 and 4, the seat base 20 may preferably include an additional (supplemental) male fastener strip 76 (a third slide fastener strip or a third engagement member) as an additional construction element of the second slide fastener 70. The additional male fastener strip 76 has the same construction as the male fastener strip 74 (the second engagement member). That is, the additional male fastener strip 76 is constructed to be capable of engaging the female fastener strip 72 (the first engagement member). As best shown in FIG. 2, similar to the female fastener strip 72, the additional male fastener strip 76 may preferably be positioned on the side and front surfaces 34 and 36 so as to laterally extend along the central portion thereof. However, as shown in FIG. 3, the additional male fastener strip 76 may preferably be oppositely positioned above the female fastener strip 72 so as to extend in parallel with the female fastener strip 72. In addition, the additional male fastener strip 76 may preferably be arranged to engage the female fastener strip 72. As will be recognized, the additional male fastener strip 76 is intended to be used when the seat cover 40 is not applied to the seat base 20. The additional male fastener strip 76 thus positioned is stitched on the covering member 24 of the seat base 20 (the seat 10). In particular, as shown in FIGS. 3 and 4, the additional male fastener strip 76 may preferably be stitched on an elongated upper cut edge 24b formed in the seat covering member 24. As will be appreciated, the upper cut edge 24a may preferably be formed by cutting the seat covering member 24 so as to extend along in parallel with the lower cut edge 24a formed therein.

Similar to the male fastener strip 74, upon sliding the slider 72d of the female fastener strip 72 after the additional male fastener strip 76 is mated with (adjoined to) the female fastener strip 72 by the slider 72d, the additional male fastener strip 76 engages the female fastener strip 72. Further, the male fastener strip 76 can be mated with the female fastener strip 72 at an engagement start position or a mating position thereof. As will be appreciated, the mating position of the fastener strips 72 and 76 may preferably correspond to the mating position of the fastener strips 72 and 74 (the second slide fastener 70).

As shown in FIG. 5, the female fastener strip 72 is composed of a cloth tape 72b (a base strip) and a series of metal or plastic teeth (elements) 72a that are attached to a longitudinal periphery of the cloth tape 72b. An opposite longitudinal periphery of the cloth tape 72b is stitched on the covering member 24 (the lower cut edge 24a) of the seat base 20. Thus, the female fastener strip 72 can be attached to the seat base 20. However, at an end portion of the cloth tape 72b corresponding to the mating position of the second slide fastener 70, the cloth tape 72b is stitched on the covering member 24 via a triangular additional tape 72c (the base strip). That is, the attached female fastener strip 72 (the cloth tape 72b) is widened at the end portion thereof. As a result, the end portion of the female fastener strip 72 can be easily pinched or held by fingers. This may lead to easy mating of the female fastener strip 72 and the male fastener strip 74 at the mating position thereof.

Further, as shown in FIG. 5, the additional male fastener strip 76 is composed of a cloth tape 76b (a base strip) and a series of metal or plastic teeth (elements) 76a that are attached to a longitudinal periphery of the cloth tape 76b. An opposite longitudinal periphery of the cloth tape 76b is stitched on the covering member 24 (the upper cut edge 24b) of the seat base 20. At this time, the additional fastener strip 76 (the cloth tape 76b) may preferably be positioned such that the teeth 76a can mesh with the teeth 72a of the fastener strip 72. Thus, the additional male fastener strip 76 can be attached to the seat base 20. However, at an end portion of the cloth tape 76b corresponding to the mating position of the second slide fastener 70, the cloth tape 76b is stitched on the covering member 24 via a triangular additional fastener 76c (the base strip). That is, the attached additional male fastener strip 76 (the cloth tape 76b) is widened at the end portion thereof. As a result, the end portion of the additional male fastener strip 76 can be easily pinched or held by fingers. This may lead to easy mating of the female fastener strip 72 and the additional male fastener strip 76.

In order to attach the seat cover 40 to the seat base 20, first, the seat cover 40 is positioned on the seat base 20. Thereafter, the seat cover body 42 is applied to the seat base 20 while stretching the elastic bands 46 in the forward and rearward direction of the seat 10. Thus, the seat cover 40 is attached to the seat base 20 while the elastic bands 46 are stretched so as to follow the outer surface (the sitting surface 26) of the seat base 20. At this time, the elastic band 46 can extend beyond the sitting surface 26 of the seat base 20 to the upper front surface 36a (the front surface 36) of the seat base 20. Further, when the seat cover body 42 is applied to the seat base 20, the seat cover body 42 may preferably be positioned such that the fastener strips 64 and 74 stitched on the seat cover body 42 can suitably correspond to the fastener strips 62 and 72 stitched on the seat base 20. Next, at the mating positions of the of the first and second slide fasteners 60 and 70, the fastener strips 62 and 74 are respectively mated with the fastener strips 64 and 72 by the sliders 64a and 72d. Subsequently, the sliders 64a and 72d are respectively slid from the right end portions 60a and 70a (the mating positions) of the first and second slide fasteners 60 and 70 toward left end portions (not shown) of the first and second slide fasteners 60 and 70. As a result, the fastener strips 62 and 74 respectively engage the fastener strips 64 and 72 over the entire length thereof, so that the first and second slide fasteners 60 and 70 can be fastened. Thus, the seat cover 40 can be fixedly connected to the seat base 20.

Further, at this time, the additional male fastener strip 76 is not used. That is, the additional male fastener strip 76 does not engage the female fastener strip 72. However, the additional male fastener strip 76 can be covered by the seat cover 40. Therefore, the additional male fastener strip 76 can be hidden from view.

When the seat cover 40 is attached to the seat base 20, the rear end portions 46a of the elastic bands 46 can be positioned at the rear end periphery of the sitting surface 26 of the seat base 20. Conversely, the front end portions 46b of the elastic bands 46 can be positioned at the upper front surface 36a (the front surface 36) of the seat base 20. Therefore, the elastic bands 46 can be maintained in a condition in which the elastic bands 46 are folded or turned along a curved front transition surface 37 between the sitting surface 26 and the upper front surface 36a. That is, the elastic bands 46 can closely contact the front transition surface 37 of the seat base 20 while suitably pressing the front transition surface 37. Thus, the elastic bands 46 can be maintained in a condition in which the elastic bands 46 are stretched so as to follow the outer surface (the sitting surface 26, the transition surface 37 and the upper front surface 36a) of the seat base 20.

As described above, the elastic bands 46 are inserted into the elongated insertion sheaths 47 that extend along the rear surface of the seat cover body 42. Therefore, the seat cover body 42 can suitably follow the outer surface (in particular, the sitting surface 26) of the seat base 20 with the elastic band 46.

In this embodiment, the elastic bands 46 are attached to the seat cover body 42 so as to extend along the side transition surfaces 32 of the seat base 20 (i.e., along both sides of the sitting surface 26 of the seat base 20) when the seat cover 40 is attached to seat base 20. Therefore, the seat cover body 42 can be suitably pulled down by the stretched elastic bands 46, so as to reliably follow the outer surface (the sitting surface 26) of the seat base 20 with the elastic bands 46. Thus, the seat cover body 42 can be prevented from being spaced from the sitting surface 26, so as to be suitably attached to the seat base 20.

Further, in this embodiment, the seat cover 40 can be attached to the seat base 20 after the seat cover 40 can be suitably positioned on the seat base 20. In such a case, first, the seat cover body 42 is positioned on the seat base 20 such that the fastener strips 64 and 74 stitched on the seat cover body 42 can respectively correspond to the fastener strips 62 and 72 stitched on the seat base 20. Thereafter, the fastener strip 62 is mated with the fastener strip 64 by the sliders 64a. Subsequently, the slider 64a is slid so as to engage the fastener strip 62 with the fastener strip 64, thereby fastening the first slide fastener 60. In this condition, the seat cover body 42 is applied to the seat base 20 while stretching the elastic bands 46 in the forward and rearward direction of the seat 10. Thus, the seat cover 40 can be attached to the seat base 20 while the elastic bands 46 are stretched. Next, the fastener strip 74 is mated with the fastener strip 72 by the slider 72d. The slider 72d is then slid so as to engage the fastener strip 74 with the fastener strip 72, thereby fastening the second slide fastener 70. Thus, the seat cover 40 can be attached to and fixedly connected to the seat base 20.

Conversely, in order to use the seat 10 (the seat base 20) without the seat cover 40, first, the fastener strips 62 and 74 are respectively disengaged from the fastener strips 64 and 72 by sliding the sliders 64a and 72d, so that the seat cover 40 can be removed from the seat base 20. After the seat cover 40 is removed from the seat base 20, the additional fastener strip 76 is mated with the fastener strip 72 by the slider 72d. Subsequently, the slider 72d is slid from the right end portion 70a (the mating position) of the second slide fastener 70 toward the left end portion of the second slide fastener 70. As a result, as shown by solid lines in FIG. 3, the teeth 76a of the additional fastener strip 76 mesh with the teeth 72a of the fastener strip 72 over the entire length thereof, so that the additional fastener strip 76 can engage the fastener strip 72. Thus, the fastener strip 72 can be immobilized on the seat base 20 with the aid of the additional fastener strip 76.

According to the present embodiment, the seat cover body 42 (the seat cover 40) can be attached to the seat base 20 by elastic force of the elastic bands 46. In other words, the seat cover body 42 (the seat cover 40) can be attached to the seat base 20 without directly engaging the rear surface of the seat cover body 42 with the outer surface of the seat base 20. Therefore, the seat cover 40 can be easily attached to the seat base 20.

Further, due to the elastic bands 46, the seat cover 40 can be attached to the seat base 20 while suitably following the outer surface of the seat base 20. Therefore, the seat cover 40 can be reliably or accurately attached to the seat base 20 without producing crinkling and waviness on the seat cover body 42. As a result, the seat 10 (the seat base 20) can be comfortable to sit on.

Also, no attachment member is provided to the sitting surface 26 and the side transition surfaces 32 of the seat base 20. Therefore, even if the seat cover 40 is not attached to the seat base 20 (i.e., even if the seat cover body 40 is detached from the seat base 20), the seat base 20 can have a good appearance. In addition, the seat 10 (the seat base 20) can be comfortable to sit on.

In addition, according to the present embodiment, the seat cover 40 can be fixedly connected to the seat base 20 by means of the first and second slide fasteners 60 and 70.

Further, as described above, the male fastener strips 62 and 74 can respectively be mated with the female fastener strips 64 and 72 by the sliders 64a and 72d at the mating positions of the first and second slide fasteners 60 and 70 (the right end portions 60a and 70a) that are closer to the door opening of the vehicle. Therefore, the first and second slide fasteners 60 and 70 can be easily fastened via the door opening of the vehicle. That is, the seat cover 40 can be easily attached to the seat base 20 via the door opening of the vehicle.

In addition, in the present embodiment, the additional fastener strip 76 is attached to the seat base 20. The additional fastener strip 76 is capable of engaging the fastener strip 72. Therefore, when the seat cover body 42 (the seat cover 40) is not attached to the seat base 20, the fastener strip 72 can engage the additional fastener strip 76, so as to be effectively prevented from scratching clothes of a passenger of the vehicle. Thus, the seat base 20 can be used without any problem even if the seat cover 40 is detached therefrom.

Moreover, the fastener strip 62 is widened at the end portion thereof corresponding to the mating position of the first slide fastener 60. As a result, the end portion of the fastener strip 62 can be easily pinched or held by fingers. Therefore, the fastener strips 62 and 64 can be easily mated by the slider 64a.

Similarly, the fastener strip 72 is widened at the end portion thereof corresponding to the mating position of the second slide fastener 70. As a result, the end portion of the fastener strip 72 can be easily pinched or held by fingers. Therefore, the fastener strips 72 and 74 can be easily mated by the slider 72d.

Further, the additional fastener strip 76 is widened at the end portion thereof corresponding to the mating position of the second slide fastener 70. As a result, the end portion of the fastener strip 76 can be easily pinched or held by fingers. Therefore, the fastener strips 72 and 76 can be easily mated by the slider 72d.

Second Detailed Representative Embodiment

The second detailed representative embodiment will now described in detail with reference to FIGS. 7 and 8.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, the additional fastener strip 76 in the first embodiment is replaced with an additional (supplemental) male fastener strip 78 (which will also be referred to as the third slide fastener strip or the third engagement member). As shown in FIGS. 7 and 8, the additional male fastener strip 78 is composed of a cloth tape 78b (a base strip) and a series of metal or plastic teeth 78a that are attached to a longitudinal periphery of the cloth tape 78b, and a stretchable tape 78c that is longitudinally stitched on an opposite longitudinal periphery of the cloth tape 78b. The stretchable tape 78c is stitched on the covering member 24 (the upper cut edge 24b) of the seat base 20 over the entire length thereof. At this time, as shown in FIG. 8, unlike the additional fastener strip 76 of the first embodiment, the additional fastener strip 78 (the stretchable tape 78c) is positioned such that the teeth 78a can be (upwardly) spaced away from the teeth 72a of the fastener strip 72. Thus, the additional fastener strip 78 can be attached to the seat base 20.

Figure 8:
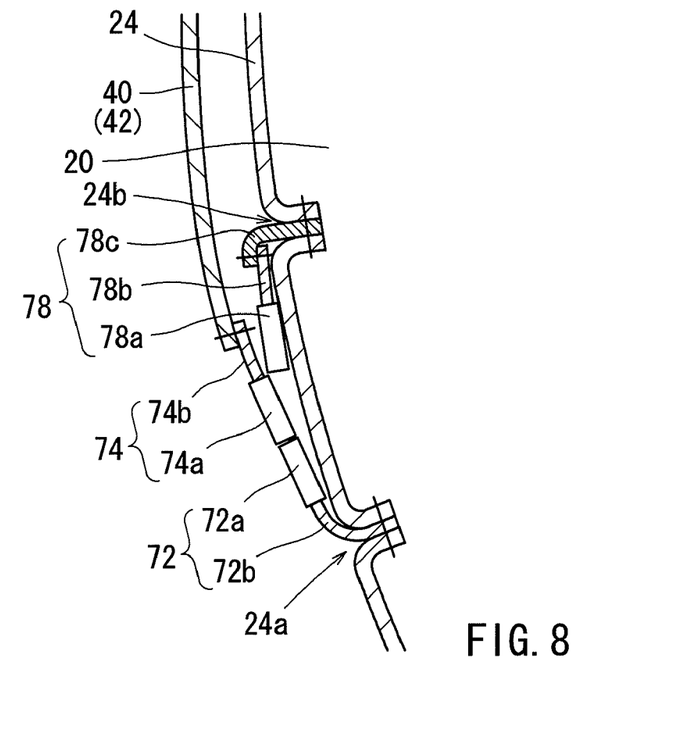
FIG. 8 is a view similar to FIG. 7, which illustrates a condition in which the seat cover is attached to the seat base.

According to this embodiment, as shown in FIG. 8, when the seat cover 40 is attached to the seat base 20 while the fastener strip 74 engages the fastener strip 72 (i.e., while the teeth 74a mesh with the teeth 72a), the additional fastener strip 78 (the teeth 78a) does not interfere with the fastener strip 74 (the teeth 74a). Therefore, the fastener strip 74 can be easily mated with the fastener strip 72 in order to fasten the second slide fastener 70. As a result, the seat cover 40 can be easily and quickly fixed to the seat base 20.

Figure 7:
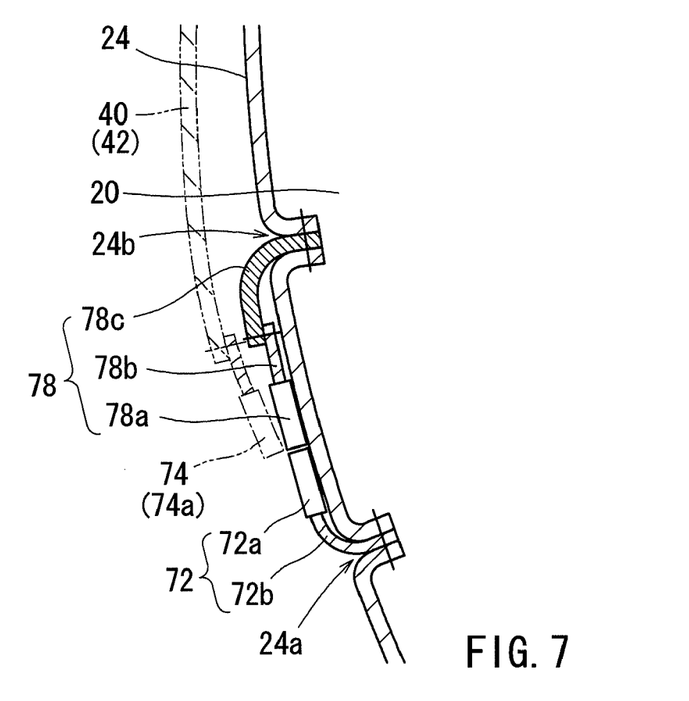
FIG. 7 is an enlarged partially cross-sectional view of a seat having a seat base and a seat cover according to a second representative embodiment of the present invention, which correspond to an encircled portion VII of FIG. 3, and which illustrates a condition in which the seat cover is detached from the seat base.

Further, as shown in FIG. 7, the additional fastener strip 78 (the teeth 78a) can be easily pulled downward because the additional male fastener strip 78 includes the stretchable tape 78c (i.e., because the additional fastener strip 78 is stretchable in a widthwise direction thereof). Therefore, when the seat cover 40 is removed or detached from the seat base 20, the additional fastener strip 78 can be easily mated with the fastener strip 72 by the slider 72d. Similar to the first embodiment, upon sliding the slider 72d, the teeth 78a of the additional fastener strip 78 can mesh with the teeth 72a of the fastener strip 72, so that the additional fastener strip 78 can engage the fastener strip 72. Thus, the fastener strip 72 can be immobilized on the seat base 20 with the aid of the additional fastener strip 78.

Naturally, various changes and modifications may be made to the present invention without departing from the scope of the invention. For example, the elastic bands 46 can be omitted, if necessary.

Further, the first and second slide fasteners 60 and 70 can respectively be replaced by various types of fasteners, such as hook and loop fasteners.

Further, the cloth tapes 62b, 72b and 76b of the fastener strips 62, 72 and 76 are respectively stitched on the covering member 24 via the triangular additional tapes 62c, 72c and 76c. However, instead of the triangular additional tapes 62c, 72c and 76c, triangular extensions can be formed in the covering member 24.

In the second embodiment, the additional fastener strip 78 includes the stretchable tape 78c that is combined with the cloth tape 78b. However, the cloth tape 78b can be formed from a stretchable material instead.

Further, the stretchable additional fastener strip 78 can be replaced with a less stretchable additional fastener strip if the cushion pad 22 of the seat base 20 has sufficient elasticity or compressibility. In such a case, the less stretchable additional fastener strip can be pulled downward with the aid of elasticity or compressibility of the cushion pad 22 of the seat base 20. In other words, the less stretchable additional fastener strip can be pulled downward while the cushion pad 22 of the seat base 20 is elastically deformed or compressed.

Further, the seat cover 40 can be constructed as a seat back cover or a head rest cover that are respectively attached to the seat back 18 and the head rest 16.

Further, the fastener strips 72 and 76 (the cloth tapes 72b and 76b and the triangular additional tapes 72c and 76c) may respectively be changed in color and design in order to increase an appearance.

What is claimed is:
1. A seat comprising:
a seat base;
a seat cover that is capable of being detachably attached to the seat base;
a first engagement member that is attached to a circumferential surface of the seat base;

a second engagement member that is attached to the seat cover; and a third engagement member that is attached to the circumferential surface of the seat base, the first engagement member cooperatively operating to affix to the second engagement member when the seat cover is attached to the seat base, so as to fix the seat cover to the seat, and the first engagement member cooperatively operating to affix to the third engagement member when the first engagement member is not cooperatively affixed to the second engagement member.

2. The seat as defined in claim 1, wherein the third engagement member is spaced away from the first engagement member.

3. The seat as defined in claim 1, wherein the first, second and third engagement members respectively include first, second and third slide fastener strips, and wherein the first slide fastener strip is capable of selectively engaging the second and third slide fastener strips.

4. The seat as defined in claim 3, wherein each of the first, second and third slide fastener strips is composed of a base strip and a series of teeth that are attached to a longitudinal periphery of the base strip, and wherein the teeth of the first slide fastener strip are capable of selectively meshing with the teeth of the second and third slide fastener strips via a slider.

5. The seat as defined in claim 4, wherein the base strips of the first and third slide fastener strips are respectively widened at a mating position thereof.

6. The seat as defined in claim 1, wherein the first engagement member is integrally attached to the circumferential surface of the seat base.

7. The seat as defined in claim 1, wherein when the first engagement member is affixed to the second engagement member, the third engagement member is hidden behind the first engagement member and the second engagement member.

8. The seat as defined in claim 1, wherein the first engagement member and second engagement members are configured to be completely detached from each other when the seat cover is detached from the seat base.

9. The seat as defined in claim 1, wherein when the first engagement member is affixed to the second engagement member, the first engagement member is affixed to the second engagement member on two lateral sides and a front side of the seat.

10. The seat as defined in claim 9, wherein the first engagement member, second engagement member, and the third engagement member all have equal lengths on at least one said side.

11. The seat as defined in claim 1, further comprising:
a fourth engagement member that is attached to a rear of the seat base;
a fifth engagement member that is attached to a rear of the seat cover, the fourth engagement member cooperatively operating to affix to the fifth engagement member when the seat cover is attached to the seat base.

12. The seat as defined in claim 11, wherein the fourth and fifth engagement members are separate from the first, second and third engagement members.

13. A fastening device for fixing a seat cover to a seat, comprising:
a first circumferential engagement member that is circumferentially attachable about a circumferential edge surface of a seat base of the seat;
a second circumferential engagement member that is circumferentially attachable about the seat cover; and
a third circumferential engagement member that is circumferentially attachable about the circumferential edge surface of the seat base, the first engagement member being alternately cooperatively circumferentially affixable to:
the second engagement member which, when in use, is capable of circumferentially fastening the seat cover about the circumferential edge of the seat base and;
the third engagement member which, when in use, is capable of unfastening the seat cover from the seat base.

14. The fastening device as defined in claim 13, wherein the first engagement member is integrally attachable to the circumferential surface of the seat base.

15. The fastening device as defined in claim 13, wherein when the first engagement member is affixed to the second engagement member, the third engagement member is hidden behind the first engagement member and the second engagement member.

16. The fastening device as defined in claim 13, wherein the first engagement member and second engagement members are configured to be completely detached from each other when the seat cover is unfastened from the seat base.

17. The fastening device as defined in claim 13, wherein when the first engagement member is affixed to the second engagement member, the first engagement member is affixed to the second engagement member on two lateral sides and a front side of the seat.

18. The fastening device as defined in claim 17, wherein the first engagement member, second engagement member, and the third engagement member all have equal lengths on at least one said side.

19. The fastening device as defined in claim 13, further comprising:
a fourth engagement member that is attachable to a rear of the seat base;
a fifth engagement member that is attachable to a rear of the seat cover, the fourth engagement member cooperatively operating to affix to the fifth engagement member when the seat cover is fastened to the seat base.

20. The fastening device as defined in claim 19, wherein the fourth and fifth engagement members are separate from the first, second and third engagement members.

* * * * *